United States Patent
Cholakon et al.

(12) 
(10) Patent No.: US 6,425,605 B1
(45) Date of Patent: Jul. 30, 2002

(54) SHAFT ASSEMBLY CAPABLE OF LENGTH VARIATION AND HAVING MINIMAL ROTATIONAL BACKLASH AND MINIMAL SLIDING RESISTANCE

(75) Inventors: Rifka Cholakon, Exton; James C. Stiles, Reading, both of PA (US)

(73) Assignee: Neapco Inc., Pottstown, PA (US)

( * ) Notice: Subject to any disclaimer, the term of this patent is extended or adjusted under 35 U.S.C. 154(b) by 0 days.

(21) Appl. No.: 09/533,153

(22) Filed: Mar. 23, 2000

(51) Int. Cl.[7] .................................................. B62D 1/18
(52) U.S. Cl. ........................................ 280/775; 280/777
(58) Field of Search .............................. 280/775, 777; 74/492, 493

(56) References Cited

U.S. PATENT DOCUMENTS

| | | | |
|---|---|---|---|
| 4,667,530 A | 5/1987 | Mettler et al. ................. 74/493 |
| 5,009,121 A * | 4/1991 | Matsumoto et al. ........... 74/493 |
| 5,086,661 A | 2/1992 | Hancock ........................ 74/493 |
| 5,187,997 A | 2/1993 | Henry-Moore ................ 74/493 |
| 5,235,734 A * | 8/1993 | DuRocher et al. ........... 29/455.1 |
| 5,243,874 A | 9/1993 | Wolfe et al. ................... 74/493 |
| 5,606,892 A * | 3/1997 | Hedderly ....................... 74/493 |
| 5,827,122 A | 10/1998 | Kurian ......................... 464/162 |
| 5,902,186 A | 5/1999 | Gaukel ......................... 464/162 |
| 5,906,543 A | 5/1999 | Jones .......................... 464/180 |
| 6,105,456 A * | 8/2000 | Higashino et al. ............. 74/492 |
| 6,167,777 B1 * | 1/2001 | Snell ............................ 74/493 |

* cited by examiner

*Primary Examiner*—Kenneth R. Rice
*Assistant Examiner*—Christopher Buchanan
(74) *Attorney, Agent, or Firm*—Woodcock Washburn LLP

(57) ABSTRACT

A shaft assembly capable of length variation is disclosed including a shaft and telescoping tube. A coupling is provided between the shaft and tube including torsion means on the shaft for providing minimal rotational backlash and roller bearings for providing minimal sliding resistance between the tube and shaft. The torsion means may take various forms such as a torsion spring or a torsion bar.

16 Claims, 5 Drawing Sheets

SHAFT ASSEMBLY CAPABLE OF LENGTH VARIATION AND HAVING MINIMAL ROTATIONAL BACKLASH AND MINIMAL SLIDING RESISTANCE

BACKGROUND OF THE INVENTION

This invention relates to shaft assemblies capable of length variation and more particularly to a torque transmitting shaft particularly useful for a motor vehicle steering column and having minimal rotational backlash while permitting minimal sliding resistance to the telescoping tube and shaft of the steering column. In a shaft assembly capable of length variation, particularly useful as a torque transmitting shaft for a motor vehicle steering column it is necessary that the steering wheel be adjusted in an axial direction towards or away from the instrument panel of the vehicle. The assembly should have a low friction adjustment with high torque capability and no perceptible backlash. A shaft assembly having these desirable features is disclosed herein.

SUMMARY OF THE INVENTION

In accordance with one aspect of the invention there is provided a shaft assembly capable of length variation, particularly useful as a torque transmitting shaft or motor vehicle steering column. The assembly includes a torque transmitting shaft and a tubular portion mounted on the shaft, the shaft and tubular portion being relatively slidable and the tubular portion having internal longitudinal track structure for receiving roller bearing means. The assembly further includes a coupling between the shaft and the tubular portion including first and second roller bearing means on the shaft, at least one of the roller bearing means being affixed to the shaft. The coupling also includes torsion means on the shaft intermediate the roller bearing means so that when the shaft and roller bearing means are assembled with the axially telescoping tube portion, the torsion means imparts a radial twist relative to one of the first and second bearing means to provide preloaded torque resistance to inhibit transmission or rotational backlash through the shaft while the bearing means permits minimal sliding resistance to the telescoping tube and shaft of the shaft assembly. In accordance with one aspect of the invention one of the roller bearing means is freely rotatable on the shaft and the torsion means is a torsion spring fixed at the ends thereof to the first and second roller bearing means so that when the shaft is assembled with the axially telescoping tube the torsion spring imparts a radial twist relative to the freely rotatable bearing means to provide preloaded torque resistance to inhibit transmission or rotational backlash to the shaft while the bearing means permit minimal sliding resistance to the telescoping tube and shaft of the shaft assembly. In accordance with another aspect of the invention both of the roller bearing means are affixed to the shaft at spaced axial and rotational locations and the shaft between the locations includes a torsion bar which creates preload by rotational axial deflection while the bearing means permit minimal sliding resistance to the telescoping tube and shaft of the shaft assembly.

For further objects and advantages of the invention reference may be had to the following drawings in conjunction with the accompanying description.

DETAILED DESCRIPTION OF THE PREFERRED EMBODIMENT

Figure 1:
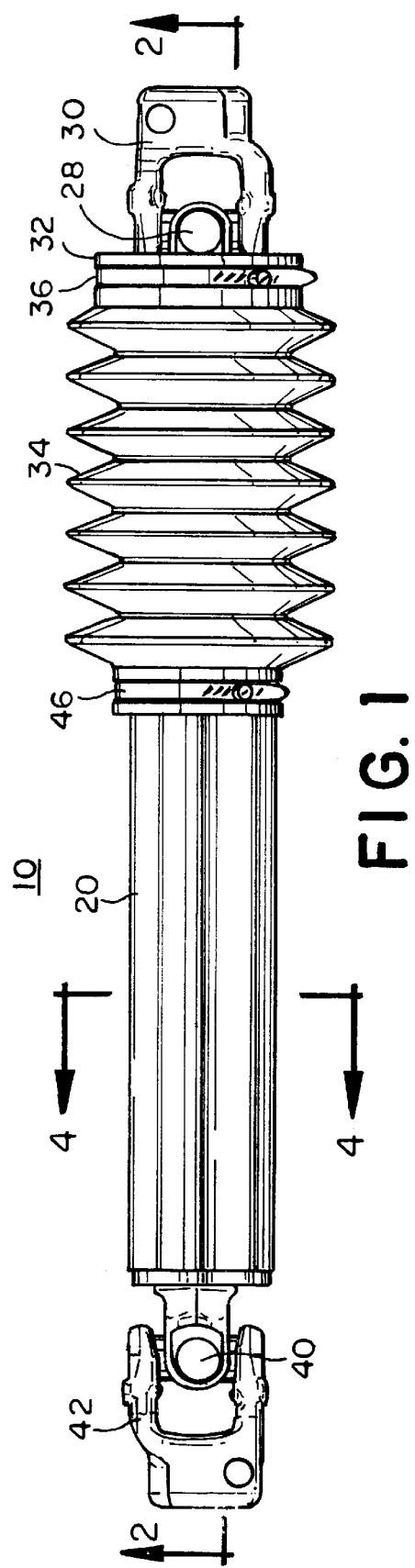
FIG. 1 is an elevational view of a preferred embodiment of the invention.
Figure 2:
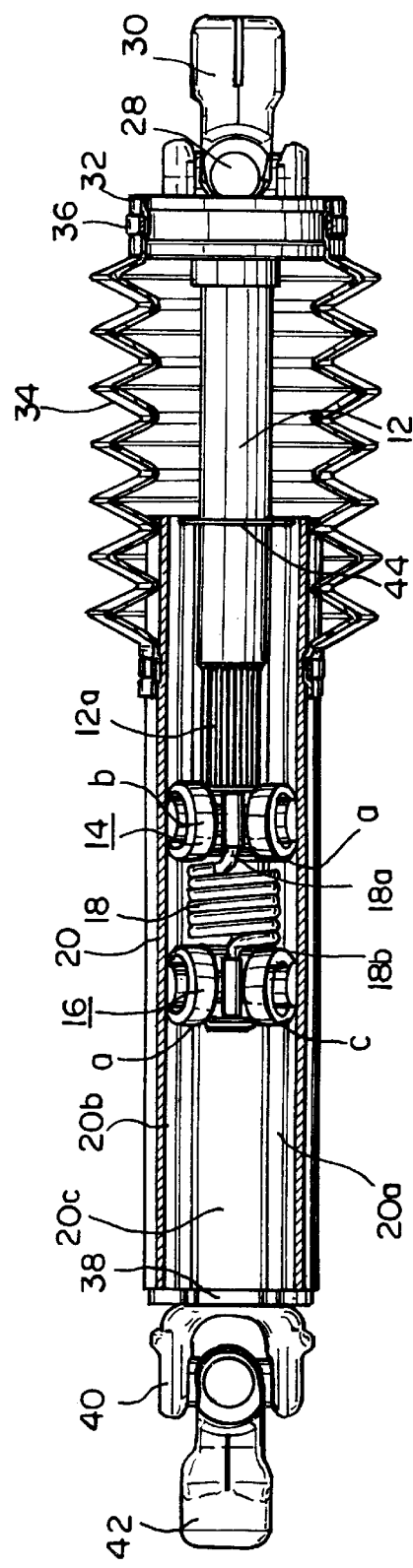
FIG. 2 is a longitudinal sectional view taken along the lines 2—2 in FIG. 1.
Figure 3:
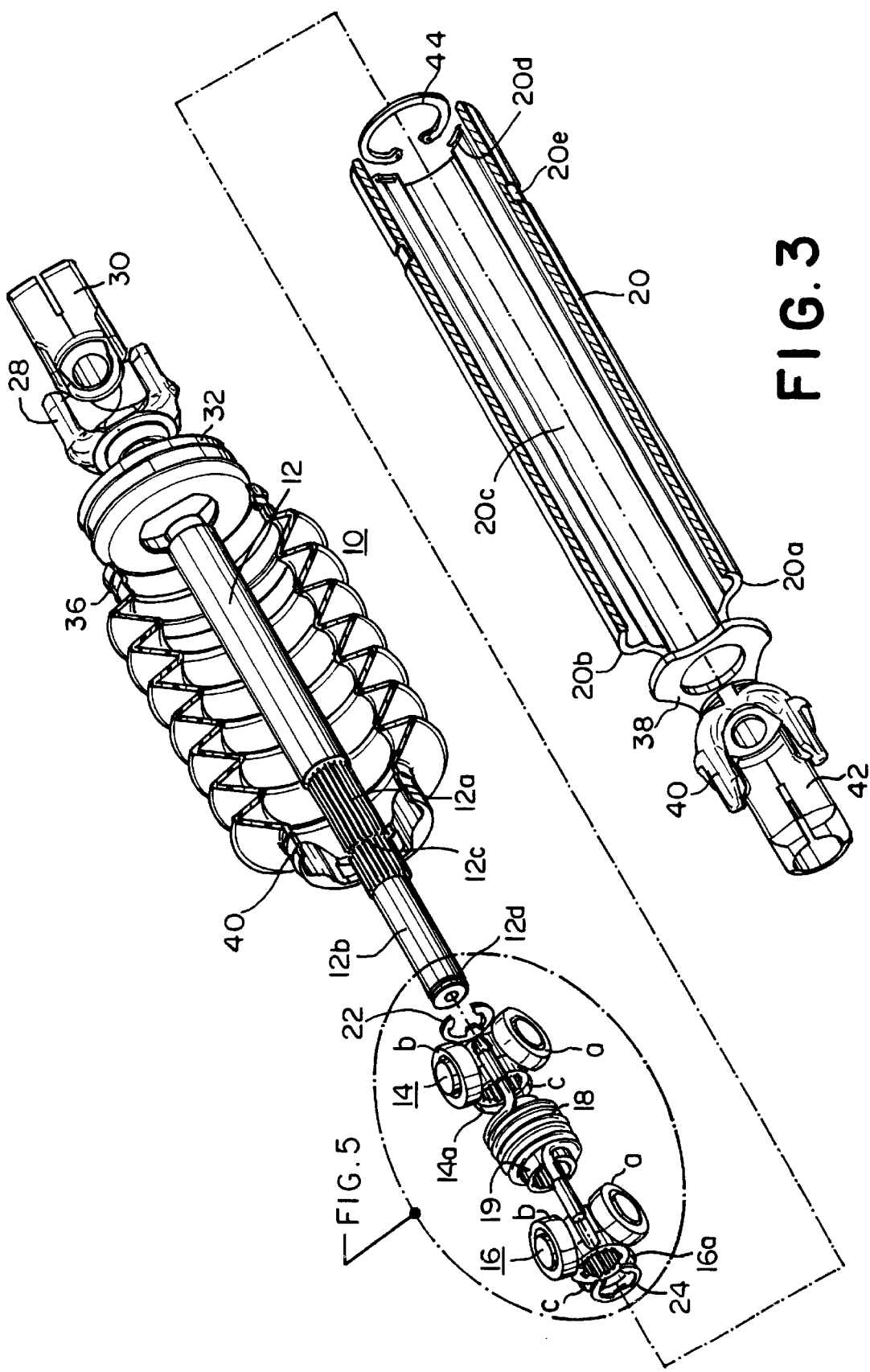
FIG. 3 is a perspective view partly in section of the preferred embodiment illustrated in FIGS. 1 and 2.
Figure 5:
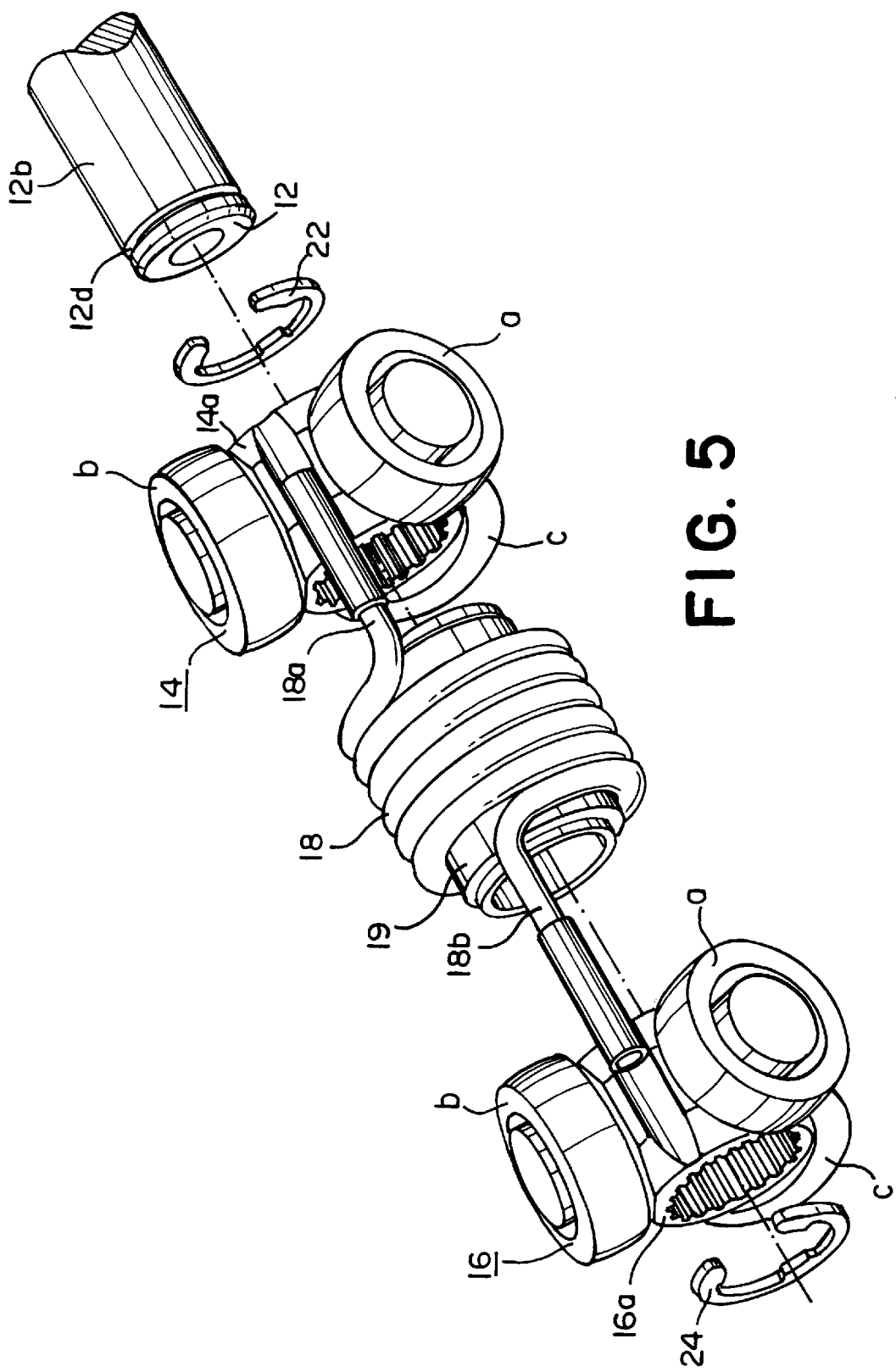
FIG. 5 is an enlarged view at the coupling in the bull's-eye in FIG. 3.

Referring to FIGS. 1–3 there is illustrated a shaft assembly 10 capable of length variation, particularly useful as a torque transmitting shaft for a motor vehicle steering column according to the present invention. The shaft assembly 10 includes a shaft 12 having a splined section 12a and a smooth section 12b. A first roller bearing means 14 is affixed to the splined portion 12a of the shaft. The roller bearing means 14 is illustrated in FIGS. 2, 3 and 5 as comprising a tripod bearing assembly including three roller bearings mounted on a ring 14a. Each having its axis substantially perpendicular to the axis of the shaft 12. The ring 14a is rigidly affixed to the shaft 12 as by welding or the like. A second roller bearing means 16 is freely rotatable on the smooth portion of the shaft 12b. The second roller bearing means 16 is a tripod bearing assembly including three roller bearings mounted on a ring 16a and having their axes substantially perpendicular to the axis of the shaft 12. A torsion means is mounted on the shaft 12 intermediate the roller bearing means 14 and 16. In FIGS. 2, 3 and 5 the torsion means is in the form of a torsion coil spring 18 having an inner sleeve 19 and affixed at the ends 18a, 18b thereof to the rings 14a and 16a of the first and second roller bearing assemblies 14 and 16. When the shaft 12 is assembled with an axially telescoping tube 20, the torsion spring 18 imparts a radial twist relative to the second bearing assembly to provide preloaded torque resistance to inhibit transmission of rotational backlash through the steering column while the bearing assemblies 14 and 16 permit minimal sliding resistance to the telescoping tube 20 and shaft 12 of the steering column 10.

The tripod bearing assemblies 14 and 16 provide a coupling between the shaft 12 and the telescoping tube 20. The coupling, including the bearing assemblies 14 and 16 and the torsion spring 18, is positioned on the shaft 12 and is held in axial position between the snap ring 22 which is received within the groove 12c in the mid-portion of the spline 12a and snap ring 24 which is received within the groove 12d at the outer end of the smooth portion 12b of the shaft. Thus it will be seen when the coupling is assembled on the shaft 12, the bearing means 14 is fixed to the splined portion 12a of the shaft 12 against the snap ring 22 and the bearing means 16 is free to rotate on the smooth portion 12b of the shaft 12 and is positioned against the snap ring 24 at the end of the shaft. The torsion spring 18 and inner sleeve 19 are likewise on the smooth portion 12b of the shaft 12.

Figure 4:
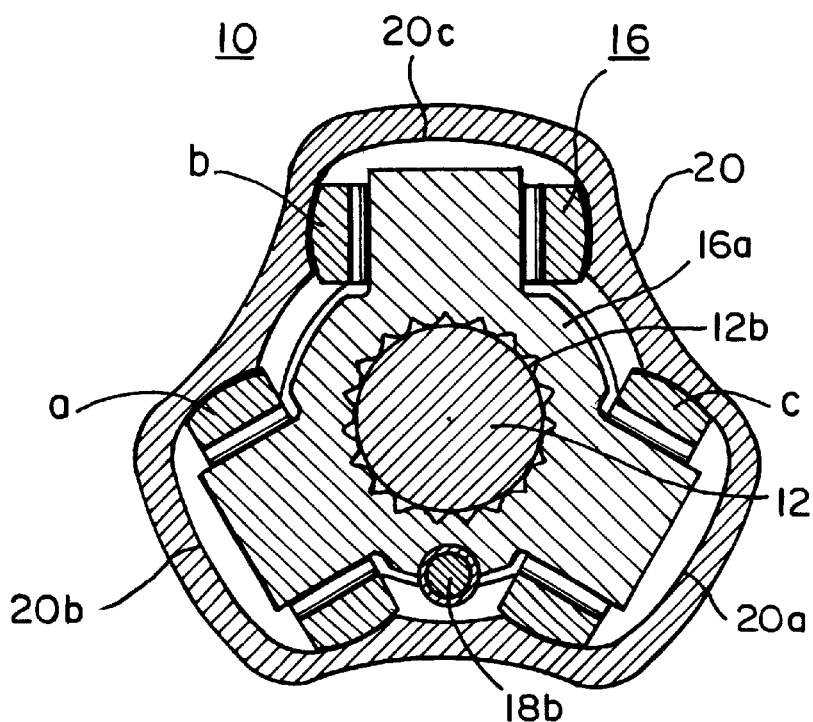
FIG. 4 is a sectional view taken along the lines 4—4 in FIG. 1.

It will be noted that tube 20 includes three longitudinal tracks 20a, 20b, and 20c within which the bearings 14 and 16 of the tripod bearing assemblies run. To set the preloaded torque on the coupling, the bearing assembly 16 is rotated in a counterclockwise direction in FIG. 3 to phase the bearing assembly 16 at 120° with respect to the bearing assembly 14. Thus, the bearings a, b, and c in assembly 14 will be in tracks 20a, 20b, and 20c while the bearings a, b, and c in assembly 16 will be in tracks 20b, 20c and 20a as shown in FIG. 4. From the foregoing it will be seen that the bearing assembly 16 is rotated in the direction of the wires in the spring 18 to set the torque. If the wire in the spring 18 were wound in the opposite direction then the bearing assembly 16 would be rotated in a clockwise direction to set the torque. In the foregoing example the pre-loaded torque resistance has been set with a one-third revolution or 120° revolution of the bearing assembly 16. It is to be understood that if greater pre-loaded torque resistance is desired the bearing assembly 16 can be rotated through a second one-third revolution or revolution of 240° if desired. It is also possible to have further revolutions if increased torque resistance is desired.

Affixed to the opposite end of the shaft 12 from the bearing assemblies 14 and 16 is a yoke 28 which forms part of a U-joint assembly 30. Also affixed to the shaft 12 adjacent to yoke 28 is a boot adapter 32 to which is connected one end of a flexible boot 34 by a hose clamp 36. The boot 34 is of the accordion type and preferably is made from a suitable material such as neoprene or the like.

The telescoping tube 20 is open at one end and at the opposite end is provided with an end plate 38 to which is affixed a yoke 40 which is part of a U-joint assembly 42. Adjacent the open end of the tube 20 there is a groove 20e for receiving a snap ring 44. This snap or retainer ring 44 is assembled on the shaft 12 before the coupling including the bearing assemblies 14 and 16 and the torsion spring 12 are assembled on the shaft 12. After the coupling means is assembled on the shaft 12, the tube 20 is assembled with the coupling means and shaft 12 and the retaining ring 44 inserted in the groove 20d at the open end of the tube 20. Tube 20 is also provided with an external groove 20e for receiving the hose clamp 46 which attaches the opposite end of the boot 34 to the tube 20.

As may be seen in FIG. 2 the boot 34 serves as a guard for the shaft 12 when the tube and shaft are telescoped. The shaft assembly 10 is shown in FIGS. 1 and 2 in approximately the mid-position. In one embodiment of the invention the distance between the axis of the U-joint assemblies 30 and 42 in the extended position was approximately 21.64 inches and in the collapsed position the distance was approximately 14.00 inches. In the mid-position as shown in FIGS. 1 and 2 the distance was approximately 17.850 inches. It will be understood that when the shaft assembly 10 is in the collapsed position the boot 34 will be completely collapsed. When the assembly 10 is in the extended position, the boot 34 likewise be in an extended position.

Figure 7:
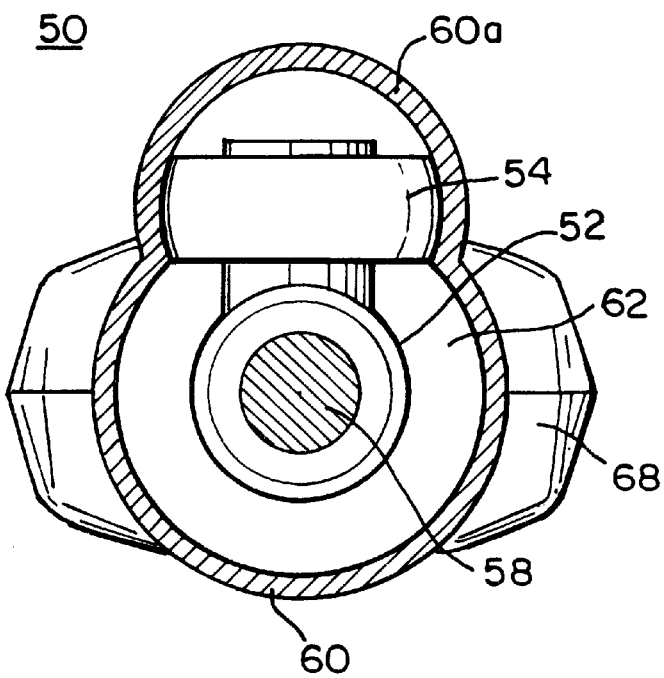
FIG. 7 is a sectional view taken long the lines 7—7 in FIG. 6.
Figure 6:
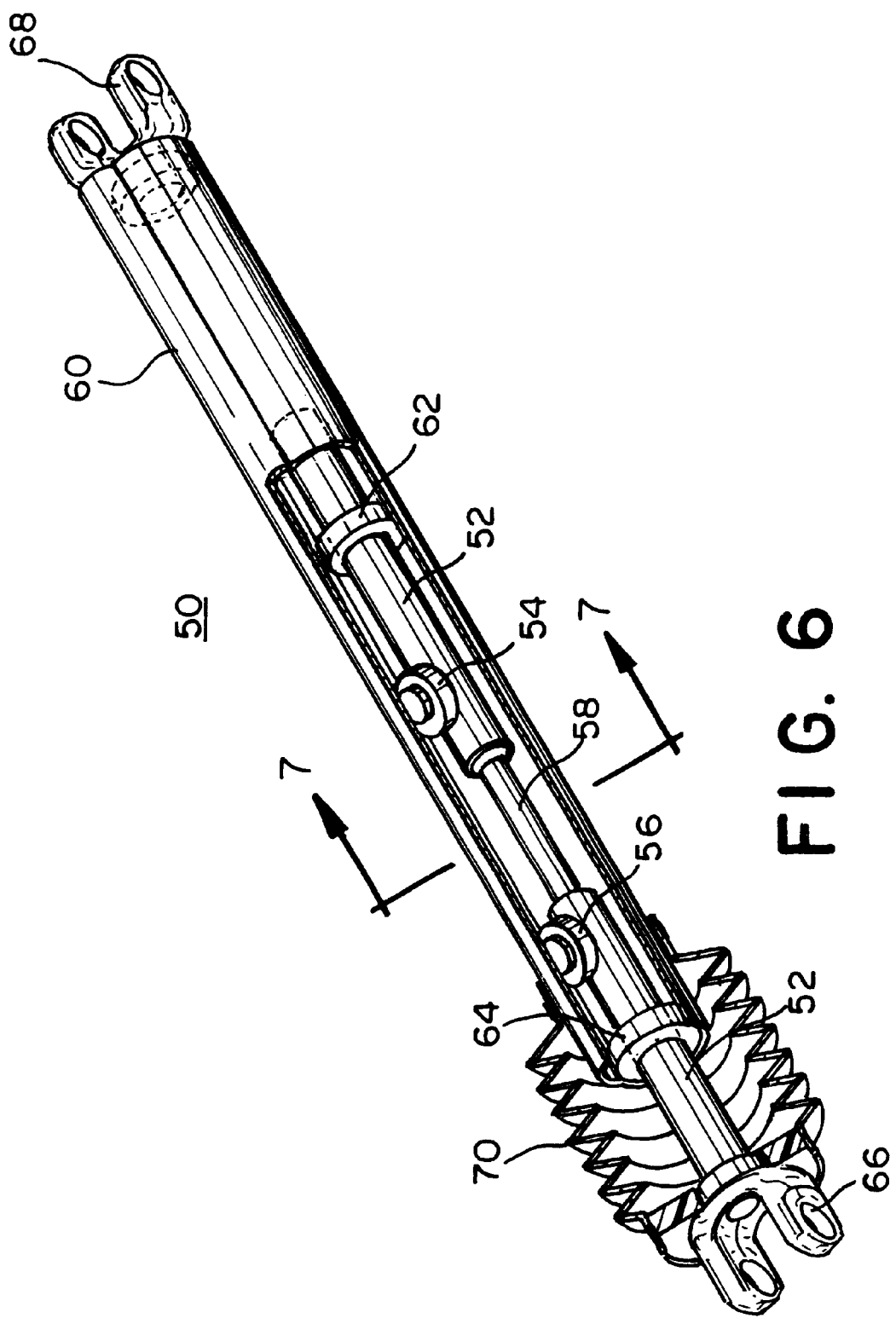
FIG. 6 is a perspective view partly in section of a modification of the invention.

Referring to FIGS. 6 and 7 there is illustrated a modification of the present invention. In FIG. 6 there is illustrated a shaft assembly 50 capable of length variation, particularly useful as a torque transmitting shaft for a motor vehicle steering column or other applications. The shaft assembly 50 includes a shaft 52 having a first roller bearing 54 and a second roller bearing 56 affixed to the shaft 52 at spaced axial and rotational locations. The axis of each of the roller bearings 54 and 56 is substantially perpendicular to the axis of the shaft 52. The shaft 52 between the locations of the bearings 54 and 56 includes a section of reduced cross-section in the form of a torsion bar 58. The shaft 52 is adapted to telescope within a tubular member 60.

The tubular member 60 includes a track portion 60a for receiving the roller bearings 54 and 56. The tube 60 also includes a pair of centralizer rings 62 and 64 which are fixed to the interior of the tube so that the shaft 52 will slide freely through them. This is best shown in FIG. 6. One end of the shaft 52 is connected to a yoke 66 while the other end of the shaft 52 is free to slide within the tube 60. As may be seen in FIG. 6 one end of the tube 60 is connected to a yoke 68 the other end of the tube 60 is connected to a flexible boot 70. The boot 70 is similar to the boot 34 described above in connection with the embodiment illustrated in FIGS. 1–4. One end of the boot 70 is connected to the tube 60 and the other end of the boot is connected to the shaft 52, FIG. 6.

The bearings 54 and 56 are fixed to the shaft 52 and are phased relative to each other at a predetermined angle with respect to the axis of the shaft 52. By way of example the axis of rotation for one of the bearings 54 and 56 can be phased at one degree from the axis of rotation for the other bearing. When the shaft 52 is assembled with the tube 60 both of the bearings 54 and 56 are assembled in the same track 60a of the tube. Due to the phased relation of the bearings 54 and 56 the torsion bar 58 creates a pre-load by reason of the rotational (axial) deflection. If greater torque is required the bearings can be phased at a greater angle. While the modification illustrated in FIGS. 6 and 7 has been illustrated with the use of two bearing assemblies, it is to be understood that each bearing assembly may have one or more bearings such as the tripod bearing assemblies illustrated in the embodiment in FIGS. 1–4. It is to be understood that if the bearings assemblies were tripod bearing assemblies such as shown in FIGS. 1–4 then the accompanying telescoping tube with such bearing assemblies would have three tracks similar to tube 20 rather than one track as illustrated in FIGS. 6 and 7. It is also to be understood in the embodiment illustrated in FIGS. 6 and 7 that a bearing in addition to the bearings 54 and 56 at a spaced location may be used. When an additional bearing is used the torsion bar 58 maybe located between any two of the bearings. Regardless of the number of bearings used, the phasing between the bearings will be the same as described above in connection with the two bearings 54 and 56 in FIGS. 6 and 7.

While there has been described a preferred embodiment of the invention, it will be understood that further modifications may be made without departing from the spirit and scope of the invention as set forth in the appended claims. It is also to be understood that while the present invention has been described in connection with a torque transmitting shaft particularly useful for a motor vehicle steering column, it is also suitable for other torque transmitting uses where minimal rotational backlash and minimal sliding resistance are required.

What is claimed is:

1. A shaft capable of length variation with an axially telescoping tube, particularly useful as a steering shaft for a motor vehicle steering column comprising:

a shaft, first roller bearing means affixed to said shaft with the axis thereof being substantially perpendicular to the axis of said shaft, second roller bearing means freely rotatable on said shaft with the axis thereof substantially perpendicular to the axis of said shaft, and a torsion spring on said shaft intermediate said first and second roller bearing means, said torsion spring being fixed at the ends thereof to said first and second roller bearing means so that when said shaft is assembled with an axially telescoping tube said torsion spring imparts a radial twist relative to said second bearing means to provide preloaded torque resistance to inhibit transmission of rotational backlash through the steering column while the bearing means permit minimal sliding resistance to the telescoping tube and shaft of the steering column.

2. A shaft according to claim 1 wherein said roller bearing means each include a plurality of roller bearings the axes thereof being substantially perpendicular to the axis of said shaft.

3. A shaft according to claim 2 wherein said first and second bearing means comprise tripod bearing assemblies and said first roller bearing means is fixed to said shaft by a spline.

4. A shaft assembly capable of length variation, particularly useful as a torque transmitting shaft for a motor vehicle steering column comprising:

a torque transmitting shaft;

a tubular portion mounted on said shaft, said shaft and tubular portion being relatively slidable and said tubular portion having internal longitudinal track structure for receiving roller bearing means; and a coupling between said shaft and said tubular portion comprising first and second roller bearing means on said shaft, at least one of said roller bearing means being affixed to said shaft, and torsion means on said shaft intermediate said roller bearing means so that when said shaft and roller bearing means are assembled with said axially telescoping tube portion, said torsion means imparts a radial twist relative to one of said first and second bearing means to provide preloaded torque resistance to inhibit transmission of rotational backlash through the shaft while the bearing means permits minimal sliding resistance to the telescoping tube and shaft of the shaft assembly.

5. A shaft assembly according to claim 4 wherein one of said roller bearing means is freely rotatable on said shaft and said torsion means comprises a torsion spring fixed at the ends thereof to said first and second roller bearing means so that when said shaft is assembled with the axially telescoping tube, said torsion spring imparts a radial twist relative to the freely rotatable bearing means to provide preloaded torque resistance to inhibit transmission of rotational backlash to the shaft while the bearing means permits minimal sliding resistance to the telescoping tube and shaft of the shaft assembly.

6. A shaft assembly according to claim 4 wherein both of said roller bearing means are affixed to said shaft at spaced axial and rotational locations and said shaft between said locations includes a torsion bar which creates preload by rotational axial deflection while the bearing means permit minimal sliding resistance to the telescoping tube and shaft of the shaft assembly.

7. A shaft assembly according to claim 4 wherein said first and second roller bearing means each include a plurality of roller bearings.

8. A shaft assembly according to claim 6 wherein said first and second roller bearing means each includes at least one roller bearing.

9. A shaft assembly according to claim 4 wherein said first and second roller bearing means each include a pair of roller bearings.

10. A shaft assembly according to claim 6 or 8 including a centralizer ring affixed to said tubular portion and having an internal diameter dimensioned to slide freely on said shaft.

11. A slider steering shaft for use in a steering column with an axially telescoping tube comprising:

a slider steering shaft, first roller bearing means affixed to said shaft with the axis thereof being substantially perpendicular to the axis of said shaft, second roller bearing means freely rotatable on said shaft with the axis thereof substantially perpendicular to the axis of said shaft, and a torsion spring on said shaft intermediate said first and second roller bearing means, said torsion spring being fixed at the ends thereof to said first and second roller bearing means so that when said steering shaft is assembled with an axially telescoping tube said torsion spring imparts a radial twist relative to said second bearing means to provide preloaded torque resistance to inhibit transmission of rotational backlash through the steering column while the bearing means permits minimal sliding resistance to the telescoping tube and shaft of the steering column.

12. A slider steering shaft according to claim 1 wherein said roller bearing means each include a plurality of roller bearings the axes thereof being substantially perpendicular to the axis of said shaft.

13. A slider steering shaft according to claim 12 wherein said first and second bearing means comprise tripod bearing assemblies and said first roller bearing means is fixed to said slider steering shaft by a spline.

14. A vehicle steering column with means for adjusting the reach of a steering wheel in an axial direction relative to the column comprising:

a steering column shaft;

a steering column tubular portion, the shaft and tubular portion being relatively slidable and the tubular portion having internal axial track structure for receiving roller bearing means; and a coupling between said steering column shaft and said steering column tubular portion comprising first and second roller bearing means on said shaft, at least one of said roller bearing means being affixed to said shaft, and torsion means on said shaft intermediate said roller bearing means so that when said shaft is assembled with said axially telescoping tube portion, said torsion means imparts a radial twist relative to one of said first and second bearing means to provide preloaded torque resistance to inhibit transmission of rotational backlash through the steering column while the bearing means permits minimal sliding resistance to the telescoping tube and shaft of the steering column.

15. A vehicle steering column according to claim 14 wherein one of said roller bearing means is freely rotatable on said shaft and said torsion means comprises a torsion spring fixed at the ends thereof to said first and second roller bearing means so that when said shaft is assembled with the axially telescoping tube, said torsion spring imparts a radial twist relative to the freely rotatable bearing means to provide preloaded torque resistance to inhibit transmission of rotational backlash to the shaft while the bearing means permits minimal sliding resistance to the telescoping tube and shaft of the steering column.

16. A variable steering column according to claim 14 wherein both of said roller bearing means are affixed to said steering shaft at spaced axial and rotational locations and said steering shaft between said locations includes a torsion bar which creates preload by rotational axial deflection while the bearing means permit minimal sliding resistance to the telescoping tube and shaft of the steering column.

* * * * *

UNITED STATES PATENT AND TRADEMARK OFFICE
CERTIFICATE OF CORRECTION

PATENT NO. : 6,425,605 B1
DATED : July 30, 2002
INVENTOR(S) : Cholakon et al.

It is certified that error appears in the above-identified patent and that said Letters Patent is hereby corrected as shown below:

<u>Column 6,</u>
Line 16, please delete "claim 1" and insert therefor -- claim 11 --.

Signed and Sealed this

Twenty-ninth Day of October, 2002

Attest:

Attesting Officer

JAMES E. ROGAN
*Director of the United States Patent and Trademark Office*